(12) United States Patent
Breslin et al.

(10) Patent No.: US 7,360,801 B2
(45) Date of Patent: Apr. 22, 2008

(54) DOOR LATCHING SYSTEM

(75) Inventors: Patrick W. Breslin, Peoria, AZ (US);
Michael H. Dilgard, Tempe, AZ (US);
Edward J. Votruba, Chandler, AZ (US); David L. Simpson, Higley, AZ (US); Thomas F. Bone, Mesa, AZ (US)

(73) Assignee: U-Haul International, Inc., Phoenix, AZ (US)

( * ) Notice: Subject to any disclaimer, the term of this patent is extended or adjusted under 35 U.S.C. 154(b) by 416 days.

(21) Appl. No.: 09/884,706

(22) Filed: Jun. 19, 2001

(65) Prior Publication Data

US 2002/0190529 A1    Dec. 19, 2002

(51) Int. Cl.
*E05C 9/12* (2006.01)
*E05C 9/00* (2006.01)

(52) U.S. Cl. ............................ 292/56; 292/11; 292/24; 292/97; 292/116; 292/DIG. 43

(58) Field of Classification Search ................. 292/11, 292/24–27, 44–48, 56, 97, 116, DIG. 32, 292/DIG. 43
See application file for complete search history.

(56) References Cited

U.S. PATENT DOCUMENTS

| | | | | | |
|---|---|---|---|---|---|
| 1,112,738 | A | | 10/1914 | Voigt ........................... 292/104 |
| 1,794,786 | A | * | 3/1931 | McBride et al. .............. 292/45 |
| 2,089,504 | A | * | 8/1937 | Reynolds ..................... 292/45 |
| 2,197,195 | A | * | 4/1940 | Schemers .................... 292/128 |
| 2,218,683 | A | * | 10/1940 | Miller .......................... 70/240 |
| 2,223,760 | A | * | 12/1940 | Haaser ......................... 292/48 |
| 2,339,537 | A | | 1/1944 | Wise ............................ 292/110 |
| D152,322 | S | | 1/1949 | Chaplin ....................... 37/338 |
| 2,576,978 | A | * | 12/1951 | Sward ......................... 292/97 |
| 2,589,872 | A | * | 3/1952 | Schetky ..................... 298/23 R |
| 2,595,450 | A | * | 5/1952 | Coffing .................... 294/82.33 |
| 2,727,774 | A | | 12/1955 | Marple et al. .............. 292/216 |
| 2,728,971 | A | * | 1/1956 | Harter ......................... 27/17 |
| 2,931,205 | A | | 4/1960 | Schmitz ...................... 292/229 |
| 3,425,727 | A | | 2/1969 | Swanson ..................... 292/129 |
| 3,578,368 | A | * | 5/1971 | Dupuis ........................ 292/45 |
| 3,585,742 | A | * | 6/1971 | Tyler ........................ 40/642.02 |
| 3,586,360 | A | * | 6/1971 | Perrotta ...................... 292/26 |
| 3,630,557 | A | * | 12/1971 | Pierce et al. ................. 292/45 |
| 3,698,592 | A | * | 10/1972 | Nelson ........................ 220/323 |
| 3,776,007 | A | * | 12/1973 | Himsl .......................... 70/86 |
| 3,776,400 | A | | 12/1973 | Schwartz .................... 296/181 |
| 3,813,119 | A | * | 5/1974 | Panici ......................... 292/122 |
| 3,884,514 | A | * | 5/1975 | Praska ......................... 292/11 |

(Continued)

FOREIGN PATENT DOCUMENTS

DE          3209646 A1     2/1983

(Continued)

*Primary Examiner*—Carlos Lugo
(74) *Attorney, Agent, or Firm*—Richard E. Oney; Tiffany & Bosco, PA

(57) ABSTRACT

A latching system comprising a base having a first keeper secured thereto, a closable member adapted to engage the base, an elongated member rotatably secured to the closable member, said elongated member including a first connector adapted to engage the first keeper when the closable member engages the base and the elongated member is rotated, and a latch plate assembly hingedly secured to the closable member and adapted to rotate the elongated member.

19 Claims, 8 Drawing Sheets

U.S. PATENT DOCUMENTS

| | | | | |
|---|---|---|---|---|
| 3,893,722 A * | 7/1975 | Galbreath et al. | ............. | 292/100 |
| 3,958,821 A * | 5/1976 | Scalera | .............. | 292/97 |
| 3,977,720 A | 8/1976 | Schreiberg | .............. | 296/181 |
| 4,003,614 A * | 1/1977 | Geer et al. | .............. | 312/332.1 |
| 4,014,572 A | 3/1977 | Binns | .............. | 292/108 |
| 4,095,829 A * | 6/1978 | Van Klompenburg | .............. | 292/241 |
| 4,239,253 A | 12/1980 | Golze | .............. | 296/181 |
| 4,273,368 A * | 6/1981 | Tanaka | .............. | 292/53 |
| 4,422,313 A * | 12/1983 | VanderWyde | .............. | 70/167 |
| 4,470,277 A * | 9/1984 | Uyeda | .............. | 70/118 |
| 4,537,441 A | 8/1985 | McCleary | .............. | 296/181 |
| 4,579,382 A | 4/1986 | Lake | .............. | 296/181 |
| 4,644,651 A * | 2/1987 | Jacobsen | .............. | 30/251 |
| 4,709,950 A | 12/1987 | Zortman | .............. | 292/92 |
| 4,773,693 A * | 9/1988 | Premji et al. | .............. | 296/65.03 |
| 4,799,718 A * | 1/1989 | Ing | .............. | 292/36 |
| 4,826,224 A * | 5/1989 | Lee | .............. | 292/254 |
| 4,848,809 A * | 7/1989 | Escaravage | .............. | 292/11 |
| 4,982,971 A | 1/1991 | Marin | .............. | 296/181 |
| 5,058,946 A | 10/1991 | Faber | .............. | 296/100.07 |
| 5,066,055 A * | 11/1991 | Saitoh et al. | .............. | 292/228 |
| 5,174,617 A | 12/1992 | Huber et al. | .............. | 292/108 |
| 5,269,586 A | 12/1993 | Hahn et al. | .............. | 292/224 |
| 5,273,325 A | 12/1993 | Zimmerman | .............. | 292/216 |
| 5,308,126 A * | 5/1994 | Weger et al. | .............. | 292/53 |
| 5,314,200 A | 5/1994 | Phillips | .............. | 296/181 |
| 5,314,218 A * | 5/1994 | Nadherny | .............. | 292/256.5 |
| 5,379,182 A * | 1/1995 | Fujimori et al. | .............. | 361/681 |
| 5,383,703 A | 1/1995 | Irvine, III | .............. | 296/181 |
| 5,391,360 A * | 2/1995 | Kochte et al. | .............. | 422/292 |
| 5,439,260 A * | 8/1995 | Weinerman et al. | .............. | 292/48 |
| 5,522,626 A | 6/1996 | Dominique | .............. | 292/198 |
| 5,547,234 A * | 8/1996 | Kinnanen | .............. | 292/25 |
| 5,624,142 A * | 4/1997 | Watson et al. | .............. | 292/241 |
| 5,632,515 A | 5/1997 | Dowling | .............. | 292/216 |
| 5,636,814 A * | 6/1997 | Rollert | .............. | 244/129.5 |
| 5,653,494 A | 8/1997 | Cleall et al. | .............. | 296/182 |
| 5,681,074 A | 10/1997 | Christensen | .............. | 296/181 |
| 5,688,004 A * | 11/1997 | Karge | .............. | 292/341.17 |
| 5,713,691 A | 2/1998 | Solberg | .............. | 403/322 |
| 5,769,478 A | 6/1998 | Vernese | .............. | 296/181 |
| 5,820,170 A * | 10/1998 | Clancy | .............. | 292/26 |
| 5,906,470 A | 5/1999 | Desjardins | .............. | 296/181 |
| 5,911,763 A * | 6/1999 | Quesada | .............. | 70/120 |
| 5,938,274 A | 8/1999 | Ehrlich | .............. | 296/181 |
| 5,979,972 A | 11/1999 | Gehman | .............. | 296/181 |
| 6,042,156 A * | 3/2000 | Jackson | .............. | 292/26 |
| 6,042,175 A | 3/2000 | Williams | .............. | 296/181 |
| 6,089,650 A | 7/2000 | Edgeller | .............. | 296/181 |
| 6,092,845 A * | 7/2000 | Koenig | .............. | 292/225 |
| 6,158,787 A * | 12/2000 | Kutschat | .............. | 292/214 |
| 6,186,580 B1 | 2/2001 | Notherm et al. | .............. | 296/181 |
| 6,199,909 B1 | 3/2001 | Kass et al. | .............. | 296/181 |
| 6,213,525 B1 * | 4/2001 | Nicola | .............. | 292/223 |
| 6,213,539 B1 | 4/2001 | Williams et al. | .............. | 296/181 |
| 6,249,948 B1 | 6/2001 | Casso | .............. | 296/181 |
| 6,279,971 B1 * | 8/2001 | Dessenberger, Jr. | .............. | 292/113 |
| 6,283,537 B1 | 9/2001 | DeVore, III | .............. | 296/181 |
| 6,367,866 B1 | 4/2002 | Moore | .............. | 296/181 |
| 6,378,904 B1 | 4/2002 | Nichoff | .............. | 296/181 |
| 6,431,615 B1 * | 8/2002 | Bastian | .............. | 292/80 |
| 6,454,320 B1 * | 9/2002 | Weinerman et al. | .............. | 292/56 |
| 6,511,105 B1 * | 1/2003 | Sakamoto | .............. | 292/113 |
| 6,543,820 B2 * | 4/2003 | Kelly | .............. | 292/97 |

FOREIGN PATENT DOCUMENTS

| | | |
|---|---|---|
| DE | 3446490 A1 | 9/1985 |
| EP | 0448490 A1 | 3/1991 |
| GB | 2101537 A | 7/1981 |

\* cited by examiner

DOOR LATCHING SYSTEM

FIELD OF THE INVENTION

The present invention relates to a door latching system, and more particularly to a door latch having a hinged latch plate assembly to engage a shaft which operates a pair of rotating latch hooks for latching the door shut.

BACKGROUND OF THE INVENTION

During the normal course of using trailers or other vehicles it is necessary to latch, secure and seal the door against unwanted entry of persons or substances, such as water. Latches for securing doors and the like are widely known and readily available. However, many such latches are difficult to latch and/or unlatch and do not provide adequate sealing between the door and the vehicle body, thereby allowing the entrance of water and other liquids into the storage compartment. The latches often require a relatively high amount of force from the user to close the latch.

Latching device such as those taught in U.S. Pat. No. 2,339,537 to Wise, U.S. Pat. No. 2,727,774 to Marple et al., U.S. Pat. No. 3,893,722 to Galbreath et al., U.S. Pat. No. 5,269,586 to Hahn et al., and U.S. Pat. No. 5,632,515 to Dowling are known. However, many of these devices are quite complicated and include a large number of moving parts.

A long felt need exists for a latching device that is easy to latch, requires a minimal amount of parts and overcomes the other disadvantages of the prior art.

SUMMARY OF THE PREFERRED EMBODIMENTS

In accordance with a first aspect of the present invention there is provided a latching system comprising a base having a first keeper secured thereto, a closable member adapted to engage the base, a elongated member rotatably secured to the closable member, the elongated member including a first connector adapted to engage the first keeper when the closable member engages the base and the elongated member is rotated, and a latch plate assembly hingedly secured to the closable member and adapted to rotate the elongated member.

In a preferred embodiment, the system includes a second keeper and the elongated member includes a second connector adapted to engage the second keeper. The first and second connectors are secured at opposite ends of the elongated member. In another preferred embodiment, the elongated member includes a rotator clevis secured thereto, and the latch plate assembly further includes a latch lever extending from the handle. The latch lever is adapted to engage the rotator clevis, so that when the handle is hinged the latch lever causes the elongated member to rotate. In another preferred embodiment, the handle includes a beak striker plate that is secured thereto and is at least partially disposed in the elongated opening in the handle. The beak striker plate defines a cam surface that is adapted for sliding contact with the beak member.

In accordance with another aspect of the present invention, there is provided a latching system for securing a first object to a second object. The latching system includes a hinged latch plate assembly including a handle, a shaft assembly including an elongated member having at least one connector secured thereto, and at least one keeper. Hinged movement of the handle causes rotational movement of the elongated member and cooperation between the at least one connector and the at least one keeper. In a preferred embodiment, the shaft assembly includes a shield portion for rotationally securing the elongated member and for securing the shaft assembly to the first object. The shield portion preferably includes a pair of spaced inner shield members and an outer shield member. The inner shield members and the outer shield member cooperate to form a tube through which the elongated member extends.

In accordance with yet another aspect of the present invention there is provided a method of latching a cover to a base. The method includes the steps of closing the cover, hinging a handle associated with the cover, rotating an elongated member having at least one connector secured thereto, and engaging the at least one connector with at least one keeper that is secured to the base, thereby latching the cover to the base.

In accordance with another aspect of the present invention, there is provided a method of removing an elongated shaft from a shaft assembly. The method comprising the steps of detaching at least one inner shield member from an outer shield member, where the inner and outer shield members cooperate to form a tube through which the elongated shaft extends, and removing the elongated shaft from the tube.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

Described herein are preferred embodiments of a latching device for lowering and latching the free end of a vehicle cover, such as a trunk, hatch, door or the like, onto the frame or base of the vehicle from an open position in which the vehicle cover or the like is disposed above the vehicle base, to a closed position where the vehicle cover is secured to the vehicle base by the latching device. It will be understood that the use of the latching device is not limited to vehicles, but can be used in any situation where a closable member is to be secured to a base. The description of the present invention herein as used with a vehicle is only exemplary and not limiting.

Figure 1:
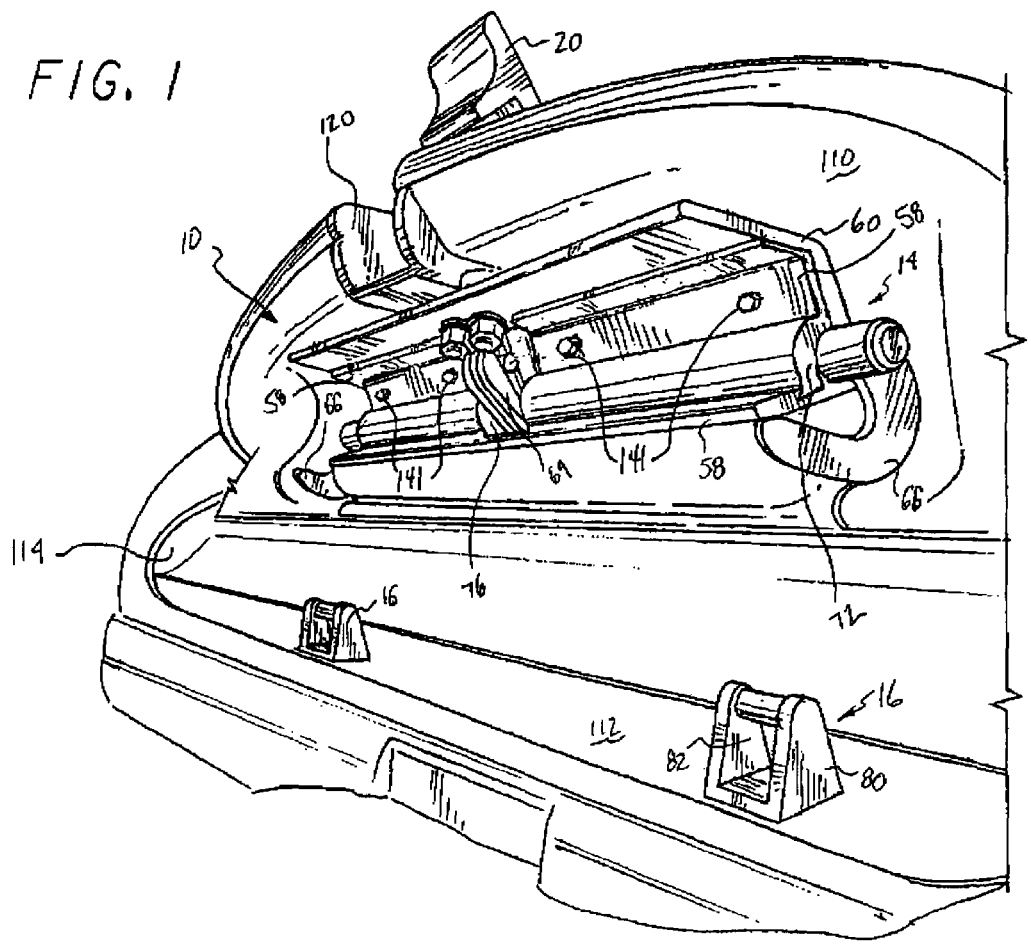
FIG. 1 is a perspective view of the open hatch of a vehicle showing a latch system having the cover portion removed in accordance with a preferred embodiment of the present invention.
Figure 2:
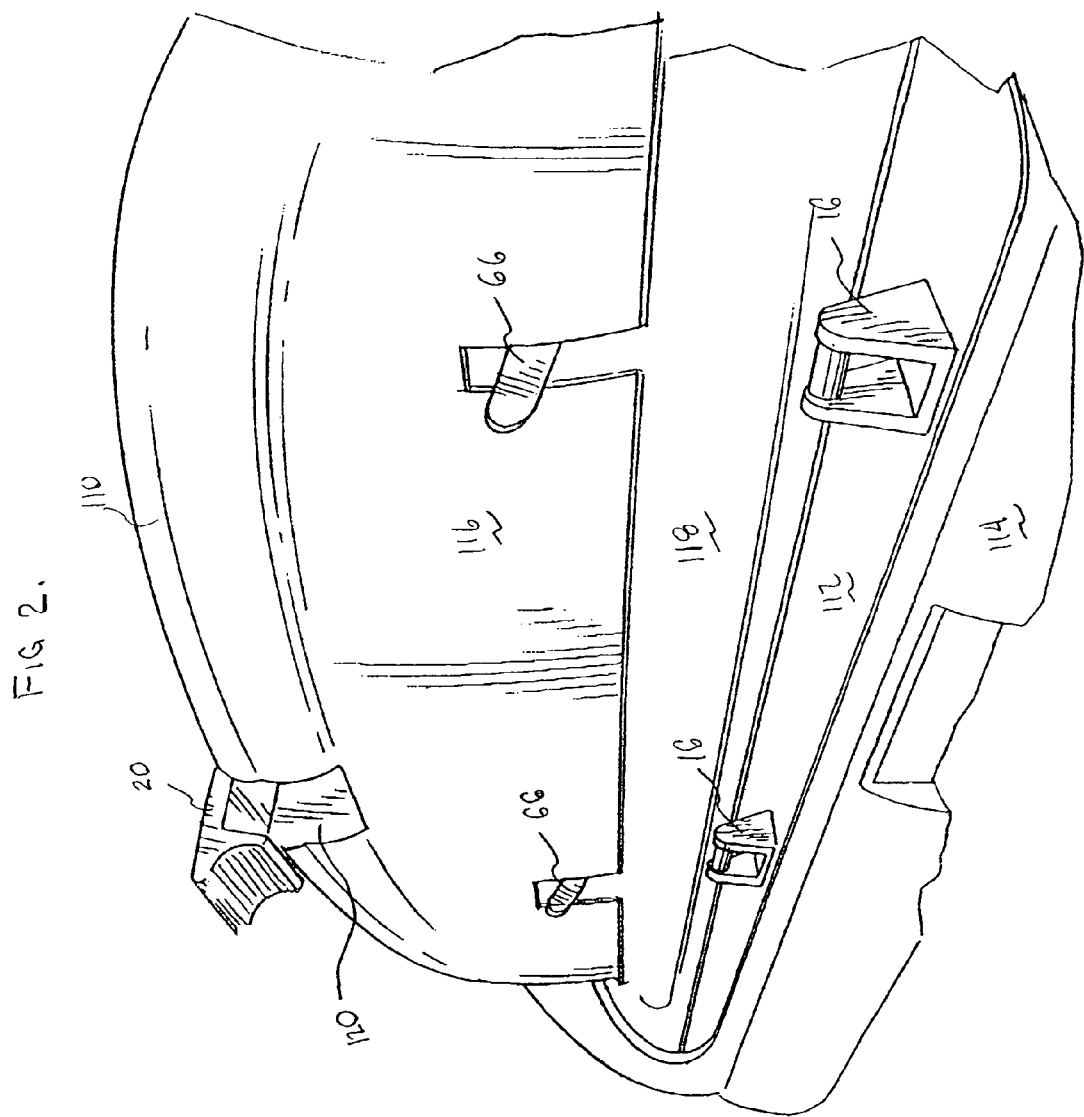
FIG. 2 is a perspective view of the open hatch of a vehicle showing the latch system of FIG. 1 thereon.

Referring to FIGS. 1-2, a preferred embodiment of a door latching system 10 is shown. The latching system 10 generally includes a hinged latch plate assembly 12 secured to a shaft assembly 14 a portion of which is in rotational cooperation with the hinged latch plate assembly 12, and a pair of keepers 16 affixed to the sill 112 of the vehicle base 114. It will be appreciated that terms such as "upper," "vertical," "horizontal," "bottom," "below," "top," "side," "inwardly," "outwardly," "downwardly" and "lower" used hereinbelow are used merely for ease of description and refer to the orientation of the components as shown in the Figures. It should be understood that any orientation of components of the latching system 10 described herein is within the scope of the present invention.

Figure 3:
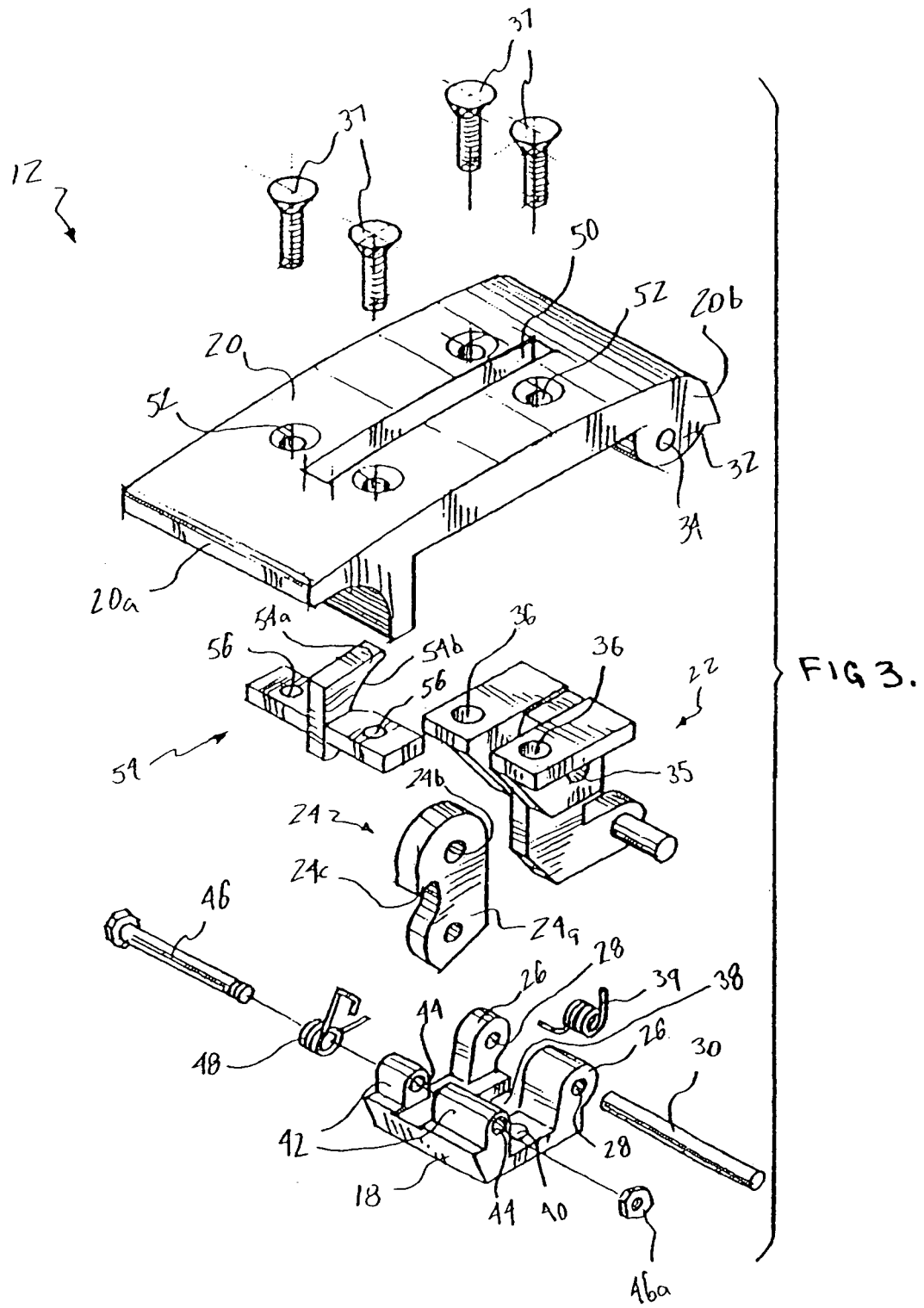
FIG. 3 is an exploded perspective of the latch plate assembly of FIG. 1.

Referring to FIG. 3, the latch plate assembly 12 generally includes a base plate 18, handle 20, latch lever 22 and beak member 24. The base plate 18 includes a first set of opposed members 26 having openings 28 defined therein for receiving a handle pivot pin 30. The handle 20 also includes opposed members 32 having openings 34 defined therein. The latch lever 22 has an opening 35 defined therethrough for receiving the handle pivot pin 30 and a pair of openings 36 defined therethrough for receiving threaded fasteners 37 for securing the latch lever 22 to the handle 20.

In assembling the latch plate assembly 12, the handle pivot pin 30 extends through openings 34 in the handle 20, openings 28 in the base plate 18 and opening 35 in the latch lever 22. The handle pivot pin 30 can be secured in place in a number of different ways. For example, the handle pivot pin may be a bolt secured in place by a nut or it may include a keyway defined therein and be secured in place via a set screw or the like. As shown in FIG. 3, base plate 18 has a recess 38 that receives a portion of the latch lever 22, and allows the latch lever 22 to rotate relative to base 18.

Preferably, the handle pivot pin 30 has a torsion spring 39 thereon to hold the handle 20 (when in the open position) at an angle (preferably approximately a 45° angle) to prevent unintentional engagement of the beak member 24 if the cover 110 should accidentally drop shut.

Base plate 18 also includes a plurality of apertures 40 defined therethrough for receiving a plurality of threaded fasteners 41 or the like for securing the base plate 18 to the shaft assembly 14. It will be understood that any method for securing the base plate 18 to the shaft assembly 14 is within the scope of the present invention. For example, the base plate 18 can be secured to the shaft assembly 14 by rivets, welding, gluing or the like.

Base plate 18 includes a second set of opposed members 42 having openings 44 defined therethrough for receiving a beak pivot pin 46. Preferably, the second set of opposed members 42 are located at an end of base plate 18 opposite that of the first set of opposed members 26. In a preferred embodiment, the beak pivot pin 46 is an elongated bolt having a nut 46a for securing the elongated bolt in place. The beak member 24 includes a main body portion 24a through which an opening 24b extends and a beak 24c. The beak pivot pin 46 extends through openings 44 in the base plate 18 and opening 24b in the beak member 24. The beak pivot pin 46 includes a torsion spring 48 or the like thereon for urging the beak member 24 into latched engagement with a striker plate 54, which is secured to handle 20 (as described more fully hereinbelow).

Handle 20 includes a handhold end 20a and a hinge end 20b. Defined preferably in a central portion of the handle 20 is an elongated opening 50 having two pairs of apertures 52 defined on opposite sides thereof. The elongated opening 50 is adapted to receive the beak member 24. Apertures 52 receive threaded fasteners 37 or the like for securing the beak striker plate 54 (via apertures 56) to the handle 20. The beak striker plate 54 includes a striker portion 54a that protrudes through elongated opening 50 and is oriented to be engaged by the beak member 24 when the latch plate assembly 12 is in a closed/latched position. The striker portion 54a includes a cam surface 54b that is engaged by the top of the beak member 24 when the latch plate assembly 12 is being closed. The curved shape of the cam surface 54b causes the beak member 24 to be urged inwardly during closing, thereby loading spring 48. As the beak member 24 reaches the end of the cam surface 54b, the spring 48 is at least partially unloaded, and the beak 24c engages the striker portion 54a. The latch plate assembly 12 is now in the latched/closed position. As shown in FIG. 3, the apertures 56 of the beak striker plate 54 correspond to one of the pairs of apertures 52 in the handle 20. Accordingly, threaded fasteners 37 are received therein for securing the beak striker plate 54 to the handle 20.

Figure 4:
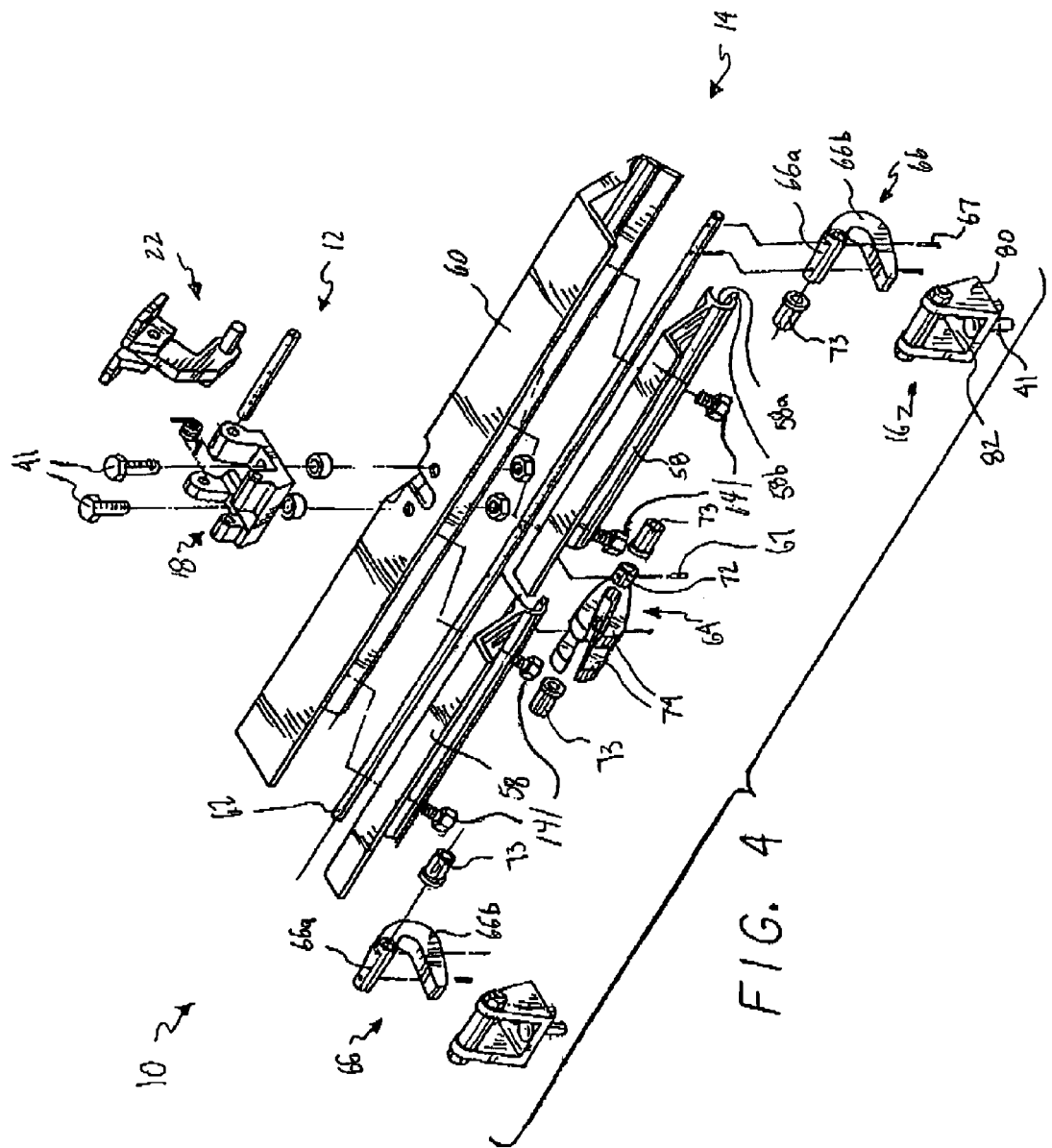
FIG. 4 is an exploded perspective view of the shaft assembly, latch plate assembly and keepers of the latch system of FIG. 1 exploded from the vehicle cover and vehicle base.

Referring to FIG. 4, the shaft assembly 14 generally includes inner shield members 58, an outer shield member 60, an elongated member or shaft 62 having a rotator clevis 64 thereon and a pair of connectors or hooks 66 preferably disposed at the ends of the elongated shaft 62. It will be appreciated by those skilled in the art that a number of different components can be substituted for the elongated member 62. For example, without limitation, the elongated member 62 can be a shaft, rod, tube, channeled member, etc. Throughout the specification and figures, an elongated shaft is shown. However, this is not a limitation on the present invention. It will also be appreciated by those skilled in the art that a number of different components can be substituted for the connectors 66. For example, without limitation, the connectors 66 can be hooks, clamps, clasps, magnets, buttons, snaps, latches, pins, etc. Throughout the specification and figures, hooks are shown. However, this is not a limitation on the present invention.

The outer shield member 60 is adapted to be affixed to the underside of the vehicle cover 110 as shown in FIG. 1. It will be understood that the outer shield member 60 provides an anchor for attaching the shaft assembly 14 to the vehicle cover 110. Any method for attaching the shaft assembly 14 to the vehicle cover 110 is within the scope of the present invention.

The inner shield members 58 are secured to the outer shield member 60 in spaced relation to one another. Preferably, the inner shield members 58 are secured to the outer shield member 60 via threaded fasteners 141. (either within tapped holes in outer shield member 60 or using nuts). This allows the shaft assembly 14 to be disassembled for maintenance. However, any method of securing the inner shield members 58 to the outer shield member 60 (i.e., welding, gluing, etc.) is within the scope of the present invention. The gap formed between the inner shield members is to accommodate the clevis 64 as described below. The inner shield members 58 have a semi-tubular portion 58a formed therein and the outer shield member 60 has a semi-tubular portion 60a formed therein. When the inner shield members 58 are secured to the Outer shield member 60 the semi-tubular portions 58a and 60a cooperate to form a tube through which the elongated shaft 62 extends. In another embodiment, the elongated shaft 62 can extend through a tube or a pair of tubes that are welded or otherwise secured to the outer shield member 60.

Figure 5:
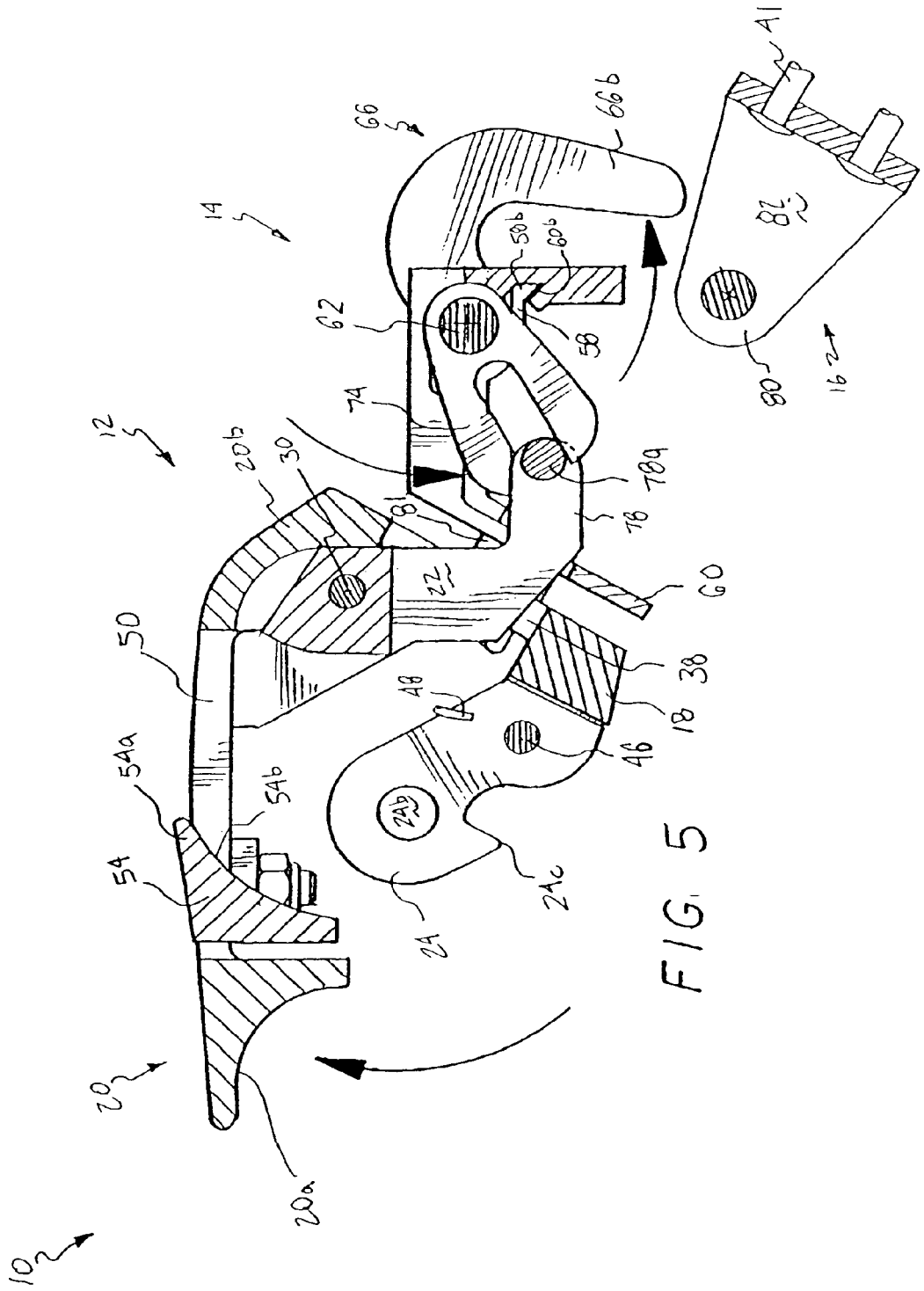
FIG. 5 is a sectional side elevation of the shaft assembly and the latch plate assembly of FIG. 1 in a retracted/unlatched position.

In a preferred embodiment, as best shown in FIG. 5, the inner shield members 58 include a tab portion 58b that is adapted to be received in a corresponding tab receiving portion 60b defined in the outer shield member 60. When the inner shield members 58 are secured to the outer shield member 60, the tab portion 58b is received in the tab receiving portion 60b, thereby helping to align the semi-tubular portions 58a and 60a and helping secure the inner shield members 58 to the outer shield member 60.

Referring again to FIG. 4, the rotator clevis 64 is comprised of a tube 72 having a pair of spaced forks 74 extending therefrom. The hooks 66 are comprised of a tube 66a having a hook member 66b extending therefrom and preferably are disposed at or adjacent to opposite ends of the elongated shaft 62. In a preferred embodiment, the hooks 66 are secured to the elongated shaft 62 by roll pins 67. The hooks can also be secured via a set screw(s) or the like. The hooks 66 may also be welded to the elongated shaft 62 or the hooks 66 and elongated shaft 62 may be formed as a unit.

As described above, the elongated shaft 62 extends through the tube (referred to herein as 72) formed by cooperating semi-tubular portions 58a and 60a. In a preferred embodiment, the tube 72 includes a plurality of bushings 73 therein for supporting the elongated shaft 62 (see the Figures for the preferred placement of bushings 73). The rotator clevis 64 is preferably secured to the elongated shaft 62 by a roll pin 67 or a set screw or screws. The elongated shaft 62 includes apertures or indentations for receiving the roll pins 67. In another embodiment, the elongated shaft 62 and the rotator clevis 64 can be formed as a unit or can be welded or otherwise adhered together.

As shown in FIG. 1, the inner shield members 58, 60 are spaced apart to form an opening 76 for receiving the rotator clevis 64 therein. As described below, in operation, the elongated shaft 62 rotates within tube 72, relative to the inner and outer shield members 58 and 60. The opening 76 allows the rotator clevis 64 to rotate as necessary.

Figure 6:
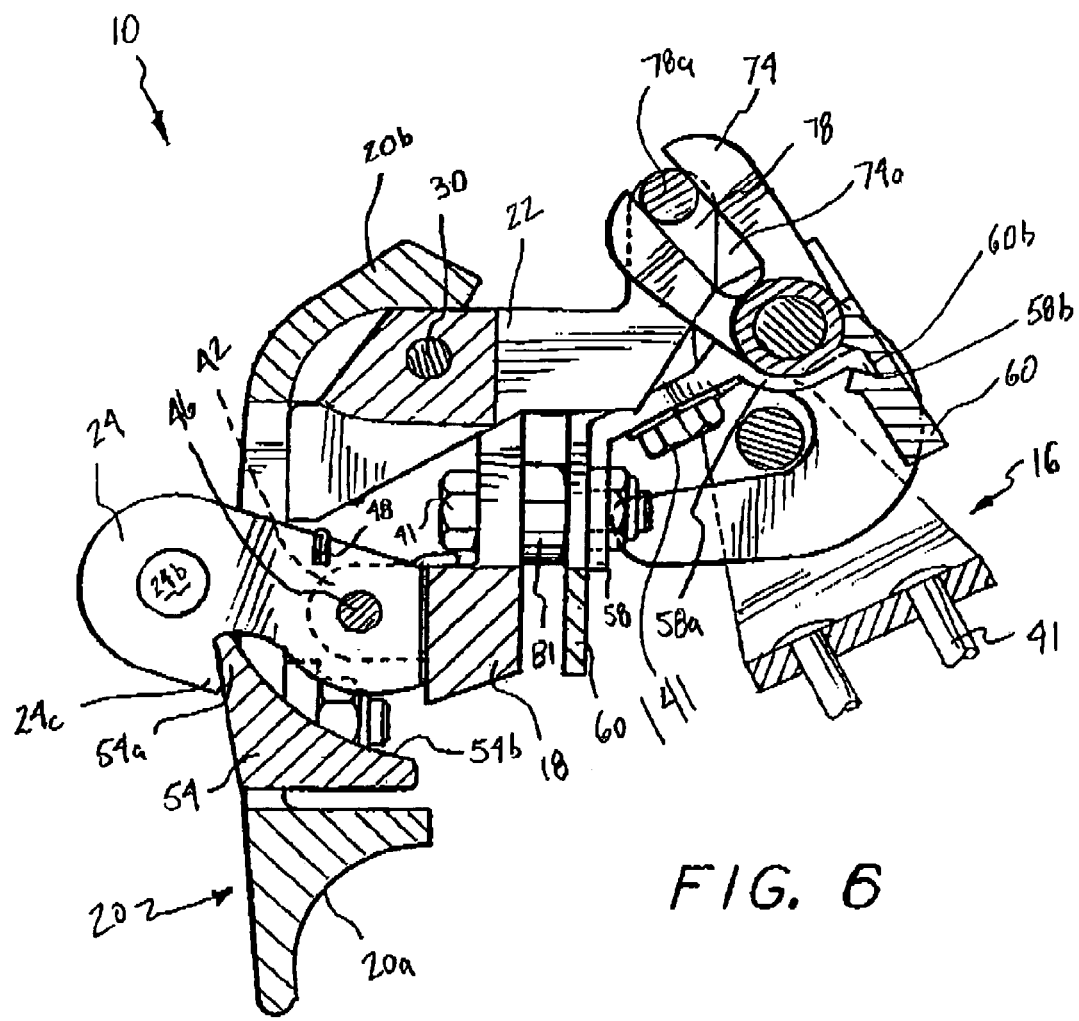
FIG. 6 is a sectional side elevation of the shaft assembly and the latch plate assembly of FIG. 1 in a latched/closed position.
Figure 7:
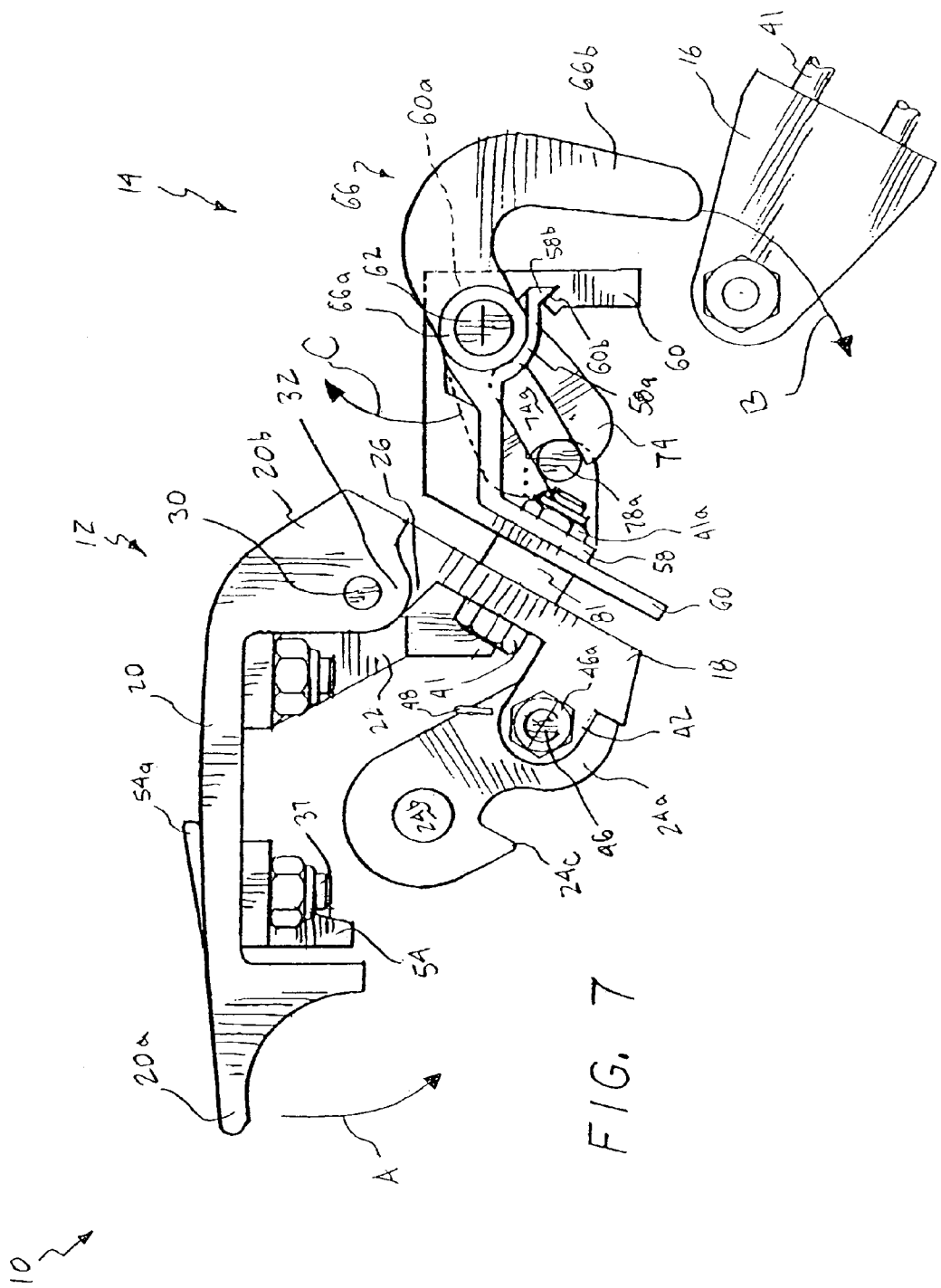
FIG. 7 is a side elevation of the latch system of FIG. 1 in a retracted/unlatched position.
Figure 8:
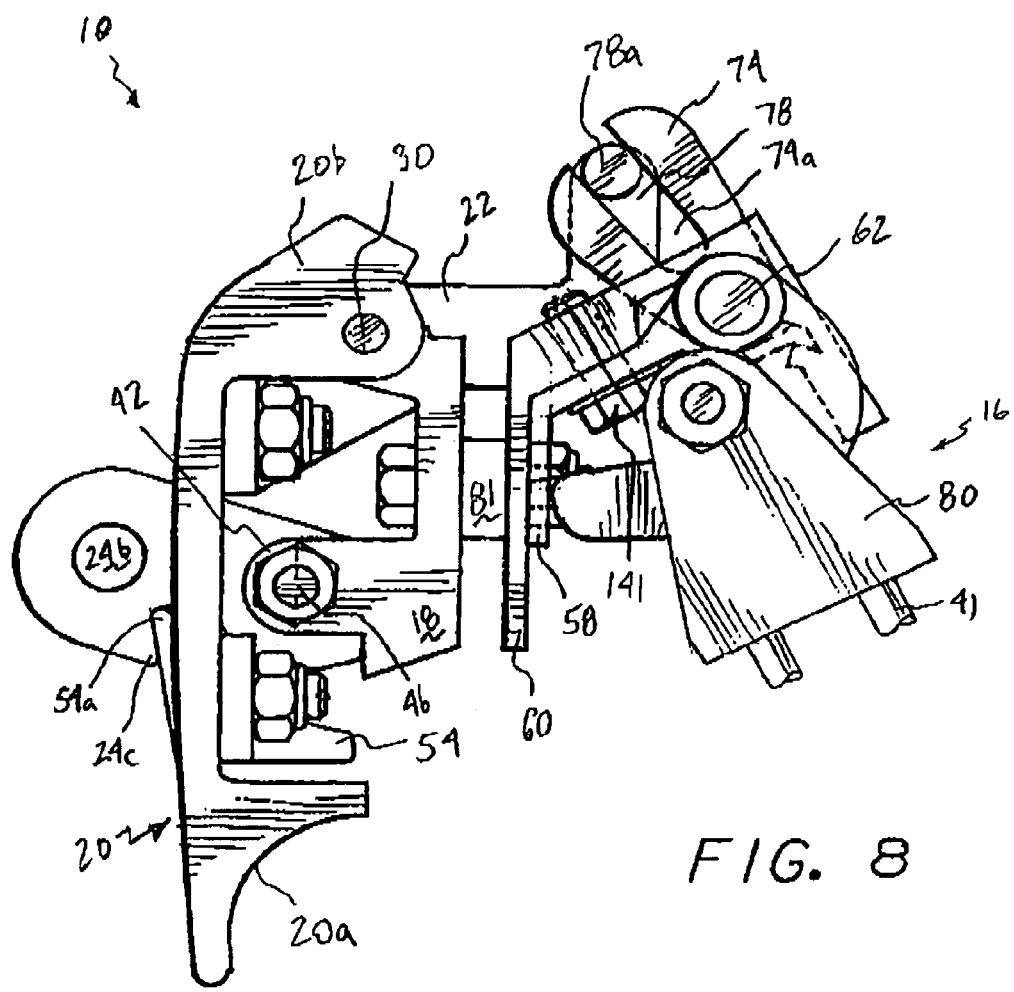
FIG. 8 is a side elevation of the latch system of FIG. 1 in a latched/closed position.

Referring to FIGS. 6-8, the latch lever 22 includes an engagement member 78 that extends through opening 76 and engages the rotator clevis 64. The engagement member 78 preferably includes a pair of opposed knobs 78a extending laterally therefrom. The opposed knobs 78a are each received in the opening 74a defined within each of the forks 74.

The outer shield member 60 also has a plurality of apertures 79 (as shown in FIG. 4) for receiving the plurality of threaded fasteners 41 or the like for securing the 25 base plate 18 to the shaft assembly 14 as described above. A spacer 81 can be placed on threaded fastener 41 to space the outer shield portion 60 from the base plate 18. In one embodiment of the invention, the vehicle cover 110 can include a protection member 116 (see FIG. 2) that substantially encloses the shaft assembly 14, but has openings defined therein for allowing the hooks 66 to extend therethrough for engagement with the keepers 16.

Referring again to FIGS. 1 and 4, the keepers 16 generally include a main body portion 80 and a hook receiving opening 82. The keepers are secured to the sill 112 of the vehicle base 114 by threaded fasteners 41. Any securing method is within the scope of the invention. The keepers 16 are positioned on the sill 112 so that they correspond to the hooks 66 when the vehicle cover 110 is closed. It will be understood that the keepers can be any structure that is capable of receiving the hooks. For example, at their simplest, the keepers may be openings defined in the vehicle base 114.

Preferably, the components of the latching system are made of a rigid material such as a metal. However, the type of material used is not a limitation on the present invention.

The operation of the latching system 10 will now be described. It will be understood that the vehicle cover 110 has an open position where the cover 110 is spaced above the vehicle base 114 and a compartment 118 defined within the vehicle base 114, and a closed position where the cover 110 engages the vehicle base 114. It will be further understood that the latching system 10 has a retracted/unlatched position and a closed/latched position. In general, hinged operation of the handle 20 causes movement of the latch lever 22 which in turn drives rotational movement of the hooks 66 via rotation of the rotator clevis 64 and elongated shaft 62.

The vehicle cover 110 preferably defines a recess 120 therein for receiving the handle 20. When the handle is in the closed/latched position, the handle is substantially flush with the top surface of the vehicle cover 110. FIG. 1 shows the latch system 10 in the retracted unlatched position and the vehicle cover 110 in the open position with the cover member 116 removed (FIG. 2 shows the cover member 116 in place). To latch the latching system 10, the vehicle cover 110 is closed, such that the hooks 66 and keepers 16 are in close proximity. The handle 20 is then hinged or pivoted inwardly (see arrow A in FIG. 7), relative to the base plate 18. This movement urges the latch lever 22 generally along the same arcuate path as the hand-hold end handle 20 is pivoting (see arrow A in FIG. 7). Latch lever 22 moves within opening 76 between the inner shield members 58 and recess 38 in the base plate 18. The movement of the latch lever 22, the knobs 78a of which are engaged within the forks 74 of the rotator clevis 64, causes rotational movement of the rotator clevis 64 (see arrow C in FIG. 7), the elongated shaft 62 and ultimately the horizontally spaced hooks 66 on the ends of the elongated shaft 62 (see arrow B in FIG. 7). The rotation of the hooks 66 causes the hook member 66b to be received in the hook receiving opening 82 of the keepers 16, thereby latching the vehicle cover 110 to the vehicle base 114. It will be understood that the hooks 66 rotate in an arcuate direction (see arrow B in FIG. 6) substantially opposite of arrow A. It will be understood that the arrows in FIG. 7 illustrate the rotational direction of the components when the latching system is being closed, and the arrows in FIG. 5 illustrate the rotational direction of the components when the latching system is being opened.

In a preferred embodiment, there is a resilient compressible material provided between the vehicle base 114 and the vehicle cover 110. As the hooks 66 engage the keepers 16, the keepers 16 are oriented such that the inner surface of the hook member 66b engages a cylindrical portion of the keeper 16. As the hook further enters the hook receiving opening 82, the force of the hook member 66b against the cylindrical portion increases, thereby compressing the resilient material and sealing the compartment 118.

As the handle 20 is hinged toward the closed position (with enough force to overcome the urging of the torsion spring 39 and the friction between the cam surface 54b and the beak member 24), the beak member 24 is received in the elongated opening 50 of the handle 20. As the beak 24c passes through the elongated opening 50, the spring 48 urges the beak 24c into engagement with the beak striker plate 54 as described above. It will be appreciated by those skilled in the art that the elements of the latch plate assembly 12 are dimensioned such that when the handle 20 is in its closed/latched position, the beak 24c engages the beak striker plate 54 and holds the latch plate assembly in its closed/latched position. In a preferred embodiment, the beak member 24 has a lock opening 24b defined therethrough for receiving a padlock or the like and preventing unauthorized unlatching of the latching system 10 and opening of the vehicle cover 110.

The embodiments of the present invention recited herein are intended to be merely exemplary and those skilled in the art will be able to make numerous modifications to them without departing from the spirit of the present invention. For example, a single hook and keeper can be used; the hook or hooks may not be disposed at the ends of the elongated shaft; the beak member 24 and torsion spring 39 may be omitted; the keepers can be an opening defined in the vehicle base; the shield 60 may be omitted and the latch plate assembly and elongated shaft may be affixed directly to the vehicle cover; the rotator clevis may be a tube or a pair of tubes that are engaged by the latch lever. All such modifications are intended to be within the scope of the present invention as defined by the claims appended hereto.

What is claimed is:

1. A latching system comprising:
   (a) a base;
   (b) a closable member;
   (c) an elongated member rotatably secured to said closable member, said elongated member including a first connector, and a rotator clevis secured to the elongated member; and
   (d) a latch plate assembly hingedly secured to said closable member, wherein said latch plate assembly includes a handle and a latch lever extending from said handle, said latch lever in mechanical communication with said rotator clevis;
   wherein hinging said handle causes said elongated member to rotate;
   wherein said elongated member includes a second connector adapted to engage a portion of said base, and wherein said first and second connectors are secured at opposite ends of said elongated member.

2. The latching system of claim 1 wherein said base has first and second keepers secured thereto, and wherein said first and second connectors are adapted to engage said keeper when said closable member engages said base.

3. A latching system comprising:
   (a) abase;
   (b) a closable member;
   (C) an elongated member rotatably secured to said closable member, said elongated member including a first connector, and a rotator clevis secured to the elongated member; and (d) a latch plate assembly hingedly secured to said closable member, wherein said latch plate assembly includes a handle and a latch lever extending from said handle, said latch lever in mechanical communication with said rotator clevis;
   wherein hinging said handle causes said elongated member to rotate;
   wherein said latch plate assembly includes a base plate; and
   wherein said handle is hingedly secured to said base plate.

4. The latching system of claim 3 wherein when said handle is hinged relative to said base plate, said latch lever causes said elongated member to rotate.

5. The latching system of claim 3 wherein said base plate includes a beak member hingedly secured thereto, and wherein said handle has an elongated opening defined therein, said elongated opening being adapted to receive said beak member.

6. The latching system of claim 5 wherein said handle includes a beak striker plate secured thereto and at least partially disposed in said elongated opening.

7. The latching system of claim 6 wherein said beak striker plate defines a cam surface, wherein said cam surface is adapted for sliding contact with said beak member.

8. The latching system of claim 5 wherein said beak member is constructed as a fuselink, whereby said beak member is easily broken without damaging the remainder of the latching system.

9. The latching system of claim 3 wherein said handle is hingedly secured to said base plate by a pivot pin.

10. The latching system of claim 9 wherein said latch plate assembly includes a spring for holding said handle in an open position relative to said base plate.

11. A latching system comprising:
    (a) abase;
    (b) a closable member;
    (c) an elongated member rotatably secured to said closable member, said elongated member including a first connector, and a rotator clevis secured to the elongated member; and
    (d) a latch plate assembly hingedly secured to said closable member, wherein said latch plate assembly includes a handle and a latch lever extending from said handle, said latch lever in mechanical communication with said rotator clevis;
    wherein hinging said handle causes said elongated member to rotate; and
    wherein said elongated member comprises an elongated shaft, and wherein said first connector comprises a first hook.

12. The latching system of claim 11 wherein said base has a first keeper secured thereto, and wherein said first hook is adapted to engage said keeper when said closable member engages said base.

13. The latching system of claim 11 wherein said first hook comprises a tube having a hook member extending therefrom, wherein said elongated shaft is received in said tube and said first hook is secured to said elongated shaft.

14. The latching system of claim 13 wherein said first hook comprises stainless steel.

15. The latching system of claim 14 wherein said first hook is made using a casting process.

16. A latching system for securing a first object to a second object, said latching system comprising:
    a) a shaft assembly secured to said first object, said shaft assembly including an elongated member having at least one connector and a rotator clevis secured thereto;
    b) a hinged latch plate assembly secured to said first object, said hinged latch plate assembly including a handle and a latch lever in mechanical communication with said rotator clevis; and
    c) at least one keeper secure to said second object:
    wherein hinged movement of said handle causes rotational movement of said elongated member and cooperation between said at least one connector and said at least one keeper;

wherein said shaft assembly includes a shield portion for rotationally securing said elongated member therein and for securing said shaft assembly to said first object; and wherein said latch plate assembly further includes a base plate secured to said shield, and wherein said handle is hingedly secured to said base plate at a first end thereof.

17. The latching system of claim 16 wherein said latch plate assembly further includes a beak member hingedly secured to said base plate at a second end thereof.

18. The latching system of claim 17 wherein said handle has an elongated opening defined therein, said elongated opening being adapted to receive said beak member.

19. A latching system for securing a first object to a second object, said latching system comprising:

a) a shaft assembly secured to said first object, said shaft assembly including an elongated member having at least one connector and a rotator clevis secured thereto;

b) a hinged latch plate assembly secured to said first object, said hinged latch plate assembly including a handle, and a latch lever in mechanical communication with said rotator clevis; and c) at least one keeper secure to said second object;

wherein hinged movement of said handle causes rotational movement of said elongated member and cooperation between said at least one connector and said at least one keeper; and wherein said elongated member comprises an elongated shaft, and wherein said at least one connector comprises at least one hook.

* * * * *